United States Patent [19]
Hollmann

[11] Patent Number: 5,442,166
[45] Date of Patent: Aug. 15, 1995

[54] LINEAR ABSOLUTE POSITION SENSOR

[75] Inventor: Joerg W. Hollmann, Midland Ontario, Canada

[73] Assignee: Hughes Aircraft Company, Los Angeles, Calif.

[21] Appl. No.: 152,153

[22] Filed: Nov. 15, 1993

[51] Int. Cl.⁶ .................. G01D 5/347; G01B 11/00
[52] U.S. Cl. ................. 250/201.1; 250/237 G; 356/373; 356/375
[58] Field of Search ............ 356/372, 373, 375; 250/231.1, 231.18, 231.19, 237 R, 237 G, 214 PR, 201.1

[56] References Cited

U.S. PATENT DOCUMENTS 3,639,769 2/1972 Clark ..................... 250/214 PR
3,708,681 1/1973 Ivers .................... 250/237 G
4,928,008 5/1990 Huggins et al. ........... 250/237 G

FOREIGN PATENT DOCUMENTS 2054135 2/1981 United Kingdom ............ 356/373

Primary Examiner—F. L. Evans
Attorney, Agent, or Firm—Hugh P. Gortler; Michael W. Sales; Wanda K. Denson-Low

[57] ABSTRACT

A position sensor includes a linear scale (14) that is translated along a translation axis of linear motion between at least two optical radiation source/receiver pairs (10/16 and 12/18). The optical transmissivity (or the optical reflectance) varies from a low value to high value going within a first region (14a) from a first end of the scale to a second end, and within a second region (14b) from a high value to a low value going from the first end to the second end. The outputs of the optical receivers (CH1, CH2) indicate a unique position along the linear scale, which is then correlated by a processor (26) with a unique position or displacement along the translation axis.

6 Claims, 3 Drawing Sheets

LINEAR ABSOLUTE POSITION SENSOR

FIELD OF THE INVENTION

This invention relates generally to optical metrology apparatus and, in particular, to linear position sensors.

BACKGROUND OF THE INVENTION

A number of systems employ one or motors to controllably position an object along a translation axis. One type of system that is of particular interest is an optical system that linearly translates a lens or a lens assembly. The movement of the lens or lens assembly is performed, by example, in order to change a depth of focus. An imaging system having a zoom lens component is one example.

A problem that is inherent in such systems relates to the ability to accurately determine the position of the lens or lens assembly along the linear translation axis. A related problem is in providing an accurate position sensor in a cost effect and simple (both electrically and mechanically) manner.

A number of known types of position sensors can be employed. These known types of position sensors include: (1) an absolute Gray encoder having a digital output; (2) a laser-based time-reflectometer; (3) a laser-based dual beam interferometer; (4) an ultrasonic position sensor; and (5) a linear potentiometer.

However, each of these known types of position sensors has one or more drawbacks. These drawbacks include high cost, high complexity, high power consumption, low resolution, the introduction of friction, and limited lifetime. For example, position sensors that rely on a moving mechanical component, such as a linear potentiometer, are subject to eventual failure. Those position sensors that employ a coherent radiation source (the laser-based systems) are generally expensive to procure, operate, and maintain, and may also require periodic calibration. An ultrasonic sensor will generally not have an accuracy that this sufficient to precisely position an object.

As can be appreciated, for certain applications, such as systems that are intended to be operated on a satellite platform, the position sensor would ideally have a high accuracy, a low power consumption, a long operational life, and would not require periodic maintenance or calibration.

SUMMARY OF THE INVENTION

It is an object of this invention to provide a linear absolute position sensor that overcomes the foregoing and other problems that are found in the prior art.

It is a further object of this invention to provide a linear absolute position sensor that employs a non-coherent, low-cost radiation source and receiver, that consumes a small amount of operating power, that provides a highly accurate position reading, and that has a potentially very long operational life.

It is one further object of this invention to provide a system that includes at least one optical component that is translated along an axis, and to further provide a linear absolute position sensor for sensing an absolute position of the at least one optical component along the axis; wherein the position sensor employs a non-coherent, low-cost optical source and receiver that consumes a small amount of operating power, that provides a highly accurate position reading, and that has a potentially very long operational life.

The objects of the invention are realized by a linear scale that is translated along a translation axis of linear motion between at least two optical radiation source/receiver pairs. The optical transmissivity (or the optical reflectance) varies within a first region from a low value to high value going from a first end of the scale to a second end, and within a second region from a high value to a low value going from the first end to the second end. The outputs of the optical receivers indicate a unique position along the linear scale, which is then correlated with a unique position or displacement along the translation axis.

The scale is arranged to be moved with an object of interest, such as a lens assembly, and the optical source/receiver pairs are provided as a part of a sensing head assembly that is fixed in position. Relative motion of the scale with respect to the sensing head assembly is thus detected and correlated with an absolute position of the scale and the object that is connected to the scale.

This invention thus teaches a position sensor that comprises a linear scale for translating along a translation axis of linear motion. The scale has an optical characteristic that spatially varies within a first region from a low value to high value going from a first end of the scale to a second end, and that spatially varies within a second region from a high value to a low value going from the first end to the second end. The sensor further includes a plurality of optical sources, individual ones of which are disposed relative to the scale for illuminating a portion of one of the regions. The sensor also includes a plurality of optical detectors, individual ones of which are disposed relative to the scale for detecting an amount of illumination that results from an interaction of the illumination, from an associated one of said plurality of optical sources, with the optical characteristic within the region illuminated by the associated optical source. Each of the plurality of optical detectors has an output for expressing the detected amount of illumination. A processor is coupled to the detector outputs for determining therefrom a position of the scale.

In one embodiment the optical characteristic is transmissivity, while in another embodiment the optical characteristic is reflectivity.

The scale is adapted to be coupled to an object that is translated along the translation axis. In a presently preferred embodiment of this invention the object is an optical component, such as a lens or a lens assembly.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
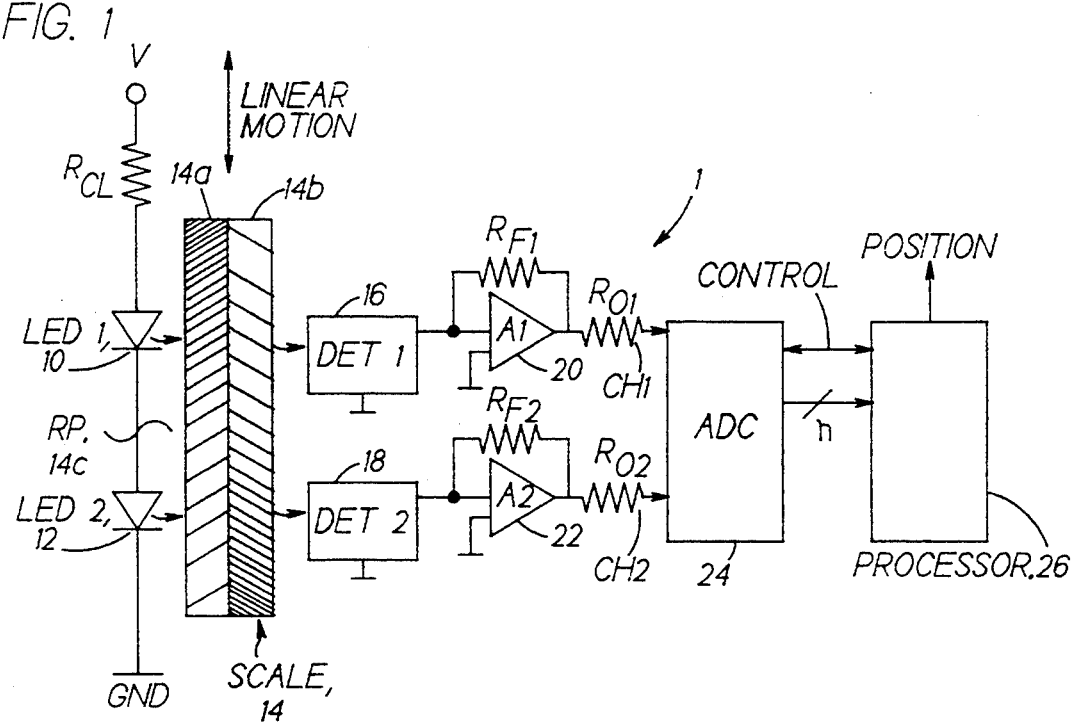
FIG. 1 is block diagram of the linear absolute position sensor of this invention, the sensor including a linear scale that is translated between a plurality of optical source/sensor pairs.

FIG. 1 is block diagram of a linear absolute position sensor 1 that is constructed in accordance with an embodiment of this invention. The sensor 1 includes at least two optical sources, embodied in a first light emitting diode (LED1) 10 and a second light emitting diode (LED2) 12. The sensor 1 further includes at least two optical receivers or detectors, embodied in a first detector (DET1) 16 and a second detector (DET2) 18. LED1 10 and DET1 16 form a first optical radiation source/receiver pair, while LED2 12 and DET2 18 form a second optical radiation source/receiver pair. DET1 and DET2 may each be a photovoltaic or a photoresistive device that are responsive to input optical radiation to output an electrical signal that is expressive of an amount of optical radiation that is received. The sources are not required to be LEDs, and could be conventional incandescent or fluorescent bulbs.

Interposed between the first and second optical source/receiver pairs is a linear scale 14. During use, the scale 14 is translated along a translation axis labeled "linear motion".

The scale 14 is partitioned into two linear regions 14a and 14b, each having a long axis that is generally parallel to the axis of linear motion. The region 14a is provided with an optical transmissivity that varies from a low value at a first end (the upper end in FIG. 1) to a high value at a second end (the lower end in FIG. 1). The region 14b is provided with an optical transmissivity that varies from a high value at a first end (the upper end in FIG. 1) to a low value at a second end (the lower end in FIG. 1) in a manner that corresponds to the variation of the region 14a.

The LED1 10 and DET1 16 are disposed on opposite sides of the scale 14 such that the region 14a is interposed between them. In like manner the LED2 12 and DET2 18 are disposed on opposite sides of the scale 14 such that the region 14b is interposed between them. Preferably, and as is shown more particularly in FIG. 4, LED1 10 and LED2 12 lie on a line that is generally orthogonal to the axis of linear motion of the scale 14, while the DET1 16 and DET2 18 are similarly disposed on the opposite side of the scale 14. This particular arrangement enables the first and second optical radiation source/receiver pairs to simultaneously sense the transmissivity of the underlying portion of the scale 14, and to thus also simultaneously sense a reference point (RP) 14c along the scale 14 wherein the transmissivities of the regions 14a and 14b are equal. This reference point 14c is preferably a point halfway along the length of the scale 14, although this exact position of the reference point 14c is not so limited.

The outputs of DET1 16 and DET2 18 are applied as Channel 1 (CH1) and Channel 2 (CH2) signals, respectively, to DC amplifiers A1 20 and A2 22, respectively, and thence to an Analog to Digital Converter (ADC) 24. The output of ADC 24 is an n-bit digital signal that is applied to an input port of a processor 26, where n is a desired degree of resolution. In other embodiments the ADC 24 could be a Voltage to Frequency Converter (VFC) having a single output that is connected to an internal counter of the processor 26. In still other embodiments the processor 26 may be selected to be a type that includes an internal ADC, thereby obviating the need to provide an external analog voltage to digital data conversion device. If an internal ADC converter is employed, then an analog signal multiplexer may be provided for selectively applying either the CH1 or the CH2 signal to the processor 26.

In the embodiment shown in FIG. 1 an additional signal path labeled CONTROL is provided between the ADC 24 and the processor 26. The signal path 26 is used to convey a start of conversion signal from the processor 26 to the ADC 24, and to convey a conversion completed signal from the ADC 24 to the processor 26. Any other required control signals can also be conveyed by this signal path.

The processor 26 operates to correlate the sensed transmissivities of the scale 14 with an absolute position of the scale 14, and an object that is mechanically coupled to the scale (such as a lens or lens assembly), along the axis of linear motion.

In FIG. 1 $R_{CL}$ is current limiting resistance for LED1 and LED2, $R_{F1}$ and $R_{F2}$ are feedback resistances that set the gain of A1 and A2, respectively, and $R_{01}$ and $R_{02}$ are output resistances for A1 and A2, respectively. The various resistances, LEDs, Detectors, and Amplifiers shown in FIG. 1 are preferably packaged together as a sensing head assembly 36 (shown in FIGS. 4 and 5) that is fixed in position during use while the scale 14 is linearly translated between the source/receiver pairs. The sensing head assembly 36 thus requires, as a minimum, a power lead (V), a ground lead (GND), and two leads for conveying the CH1 and CH2 signals to the ADC 24.

As can be appreciated, the sensing head assembly 36 is a relatively simple, low power device that requires only milliamps to operate. Furthermore, the position sensor 1 operates without introducing any friction or drag upon the scale 14, or any object that may be connected to the scale 14.

Figure 2:
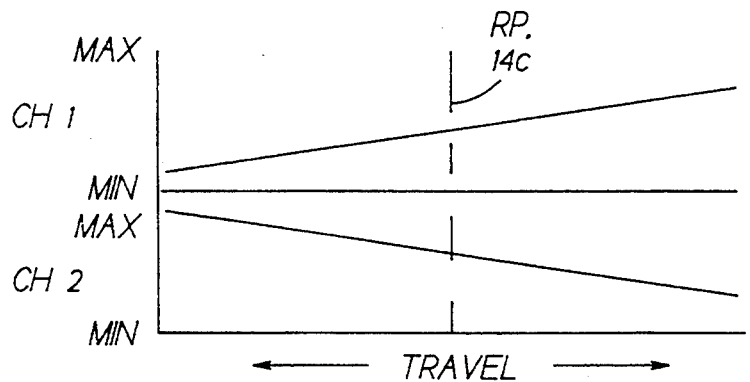
FIG. 2 illustrates exemplary outputs of the first and second analog signal channels of FIG. 1.

FIG. 2 shows the outputs of CH1 and CH2 over a range of travel of the scale 14. As can be seen, CH1 varies from a minimum (MIN) to a maximum (MAX) value over the range of travel while CH2 varies in an opposite manner from the MAX to the MIN value. At a predetermined point, (RP 14c) the magnitudes of CH1 and CH2 are equal.

Figure 3:
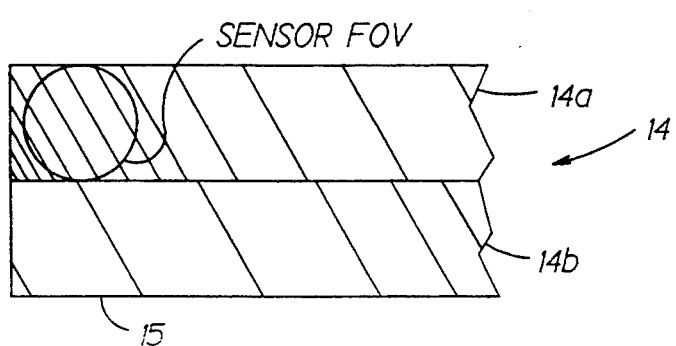
FIG. 3 illustrates a portion of the linear scale of FIG. 1 and shows the use of constant width bars to achieve a spatial variation in an optical transmissivity of the scale.

FIG. 3 shows one embodiment of the scale 14, and in particular illustrates the regions 14a and 14b having a variable optical transmissivity. In this embodiment of the invention the spatial variation of the optical transmissivity is achieved by the use of a plurality of constant width opaque bar patterns that are formed over a transparent substrate 15. The spacing between the bars is selected as a function of the sensor field of view (FOV) to provide an optical transmissivity that varies in a uniform manner along a long axis of the transparent substrate 15. In another embodiment the variable transmissivity is achieved by forming a pattern of small dots of increasing density from one end of the region 14a or 14b to the other. In a further embodiment the variable transmissivity is achieved through the use of a pattern of small rectangles of increasing density. The use of an optical coating that is selectively applied to vary the optical transmissivity may also be used in place of the discrete bars, dots, or rectangles.

Figure 4:
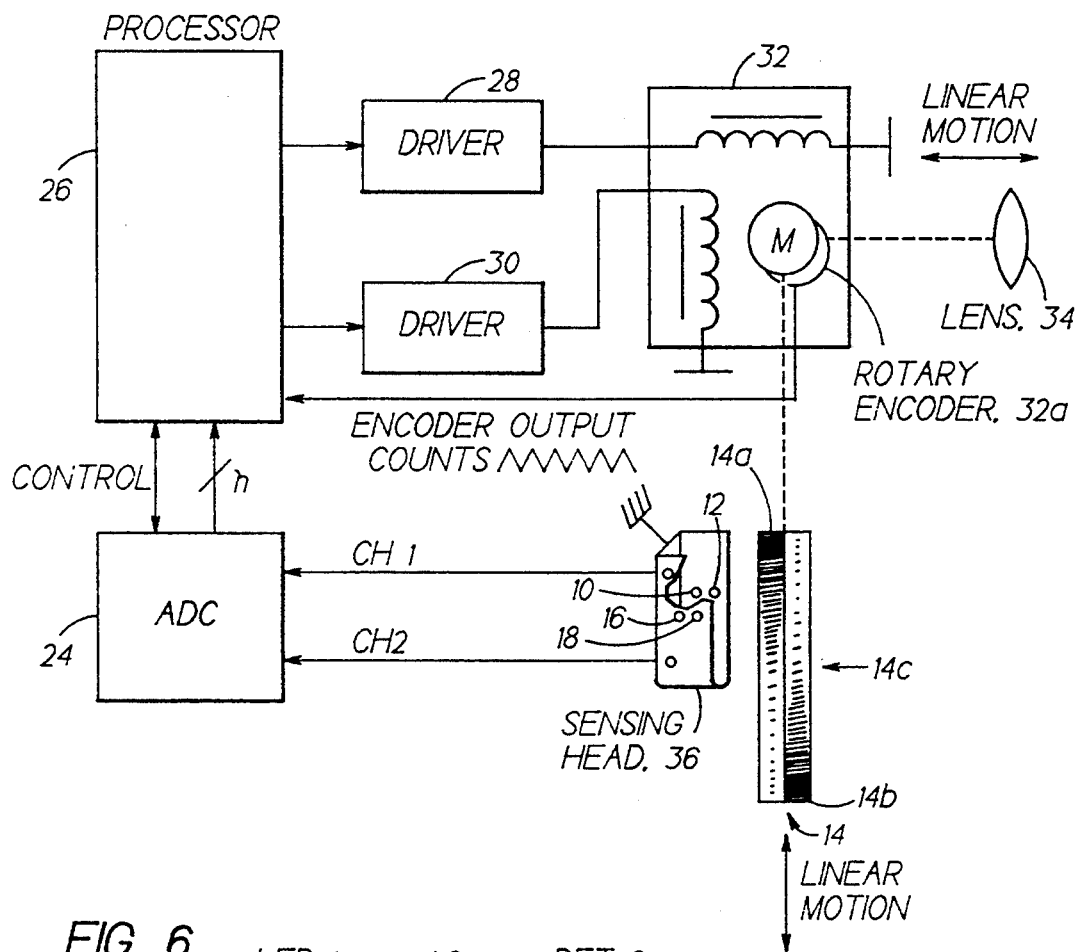
FIG. 4 is a block diagram of an exemplary embodiment of a lens positioning system that employs the linear absolute position sensor of this invention to provide a position feedback signal to a controller.

FIG. 4 illustrates an optical system 40 that is constructed to employ the linear absolute position sensor 1 of this invention. Components found in FIG. 1 are numbered accordingly. The processor 26 has two outputs coupled to motor drivers 28 and 30. Each of the drivers 28 and 30 has an output coupled to an associated winding of a motor 32. The motor 32 is mechanically coupled to a lens 34 and also to the scale 14. Under control of the processor 26, the motor 32 provides a linear motion to the lens 34 and a corresponding linear motion to the scale 14. The scale 14 moves between the source/receiver pairs that are provided on the sensing head 36 which is rigidly coupled to a support structure. The outputs CH1 and CH2 of the sensing head 36 are converted to digital values by the ADC 24 and are provided to the processor 26. By reading the values of CH1 and CH2, the processor 26 is enabled to determine the absolute position of the lens 34 with respect to the reference point 14C. The sensing head 36 thus provides position feedback to the closed loop lens positioning system that is illustrated in FIG. 4.

If desired, the motor 32 can be provided with a rotary encoder 32a having an output for conveying output counts to the processor 26. The combination of the linear position sensor 1 and the rotary encoder 32a makes the rotary encoder absolute, and may improve the overall resolution of the linear sensor. The processor 26 combines the CH1 and CH2 signals with the rotary encoder output counts to derive the absolute position of the lens 34.

Figure 5:
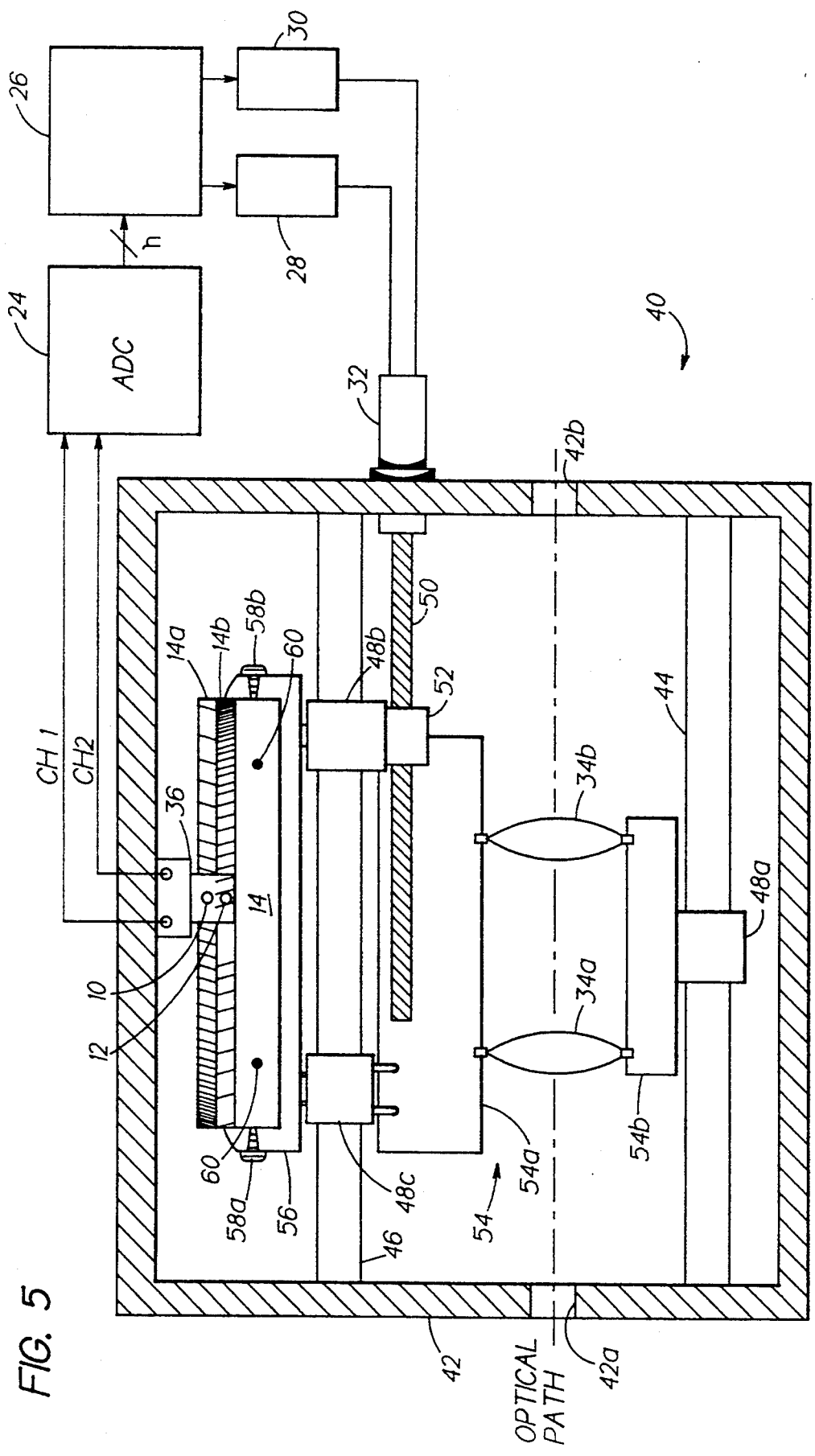
FIG. 5 is a simplified cut-away view of the lens positioning system of FIG. 4.

FIG. 5 illustrates in greater detail the system 40 of FIG. 4. In FIG. 5 the system 40 includes a rigid frame 42 having first and second apertures 42a and 42b. The apertures 42a and 42b are arranged such that a beam of light can pass through the frame 42 along an optical axis. The system 40 further includes a first slider bar 44 and a second slider bar 46 to which are coupled in sliding engagement a plurality of circular bearings 48a, 48b and 48c. The motor 32 is provided with a lead screw 50 which rotates under control of the processor 26, via drivers 28 and 30. Matingly coupled to the lead screw 50 is a threaded nut assembly 52 that is connected to the circular bearing 48b and to a first portion 54a of a lens frame assembly 54. The first portion 54a of the lens frame assembly 54 is also coupled to the circular bearing 48c and, through lenses 34a and 34b, to a second portion 54b of the lens frame assembly 54. Portion 54b is also connected to the first circular bearing 48a. Rotation of the lead screw 50 thus results in a linear translation of the lens assembly 54 and the attached lenses 34a and 34b in a direction that is along and generally parallel to the optical axis. The lenses 34a and 34b are thus disposed within the optical path between apertures 42a and 42b and may function as, by example, a zoom lens assembly.

Lens assembly position feedback is provided by the position sensor 1 of this invention. More particularly, a scale mounting assembly 56 is connected to the circular bearings 48b and 48c and is free to move therewith along the slider bar 46. Adjustably mounted to the scale mounting assembly 56 is the scale 14, including the regions 14a and 14b. A plurality of a zero adjustment screws 58a and 58b are provided for adjusting the lateral position of the scale 14 with reference to the scale mounting assembly 56. When the scale 14 is suitable positioned locking screws 60 are tightened to fix the scale 14 in position. The sensing head assembly 36 is rigidly coupled to the frame 42 and is disposed such that the regions 14a and 14b are translated between the source/receiver pairs in a non-contact, frictionless manner.

One suitable alignment and zeroing procedure is as follows. Lens assembly 54, and thus also the scale mounting assembly 56 and scale 14, are moved to a mechanical center position and held in place. With the sensing head assembly 36 and other circuitry powered on the zero adjustment screws 58a and 58b are adjusted to laterally position the scale 14 so as to produce an equal output voltage on both CH1 and CH2. The locking screws 60 are then tightened to hold the scale 14 in position. The lens assembly 54 is then moved from one extreme of linear travel to the other, and the CH1 and CH2 values are recorded at each extreme. The CH1 and CH2 values at the extremes of linear motion are then equated with the MIN and MAX values.

As indicated, the mechanical center is given by equal output voltages for CH1 and CH2. The MIN and MAX values of CH1 and CH2 give the respective end positions. The absolute values of the MIN and MAX signals at the mechanical end positions are recorded by the processor 26. Mechanical limit switches are thus not required, in that the detection of the MIN and MAX values by the processor 26 indicates that the scale mounting assembly 56, and thus also the lens assembly 54, has been driven to a predefined extreme linear position.

Although described thus far as using two source/receiver pairs (LED1/DET1 and LED2/DET2), the position sensor of this invention may employ more than two source/receiver pairs. By example two or more source/receiver pairs may be disposed in a side by side relationship for each of the regions 14a and 14b.

Also, although the invention has been described thus far in the context of a scale having an optical transmissivity that spatially varies along a length of the scale, it is within the scope of this invention to provide a scale having an optical reflectance that spatially varies along a length of the scale.

Figure 6:
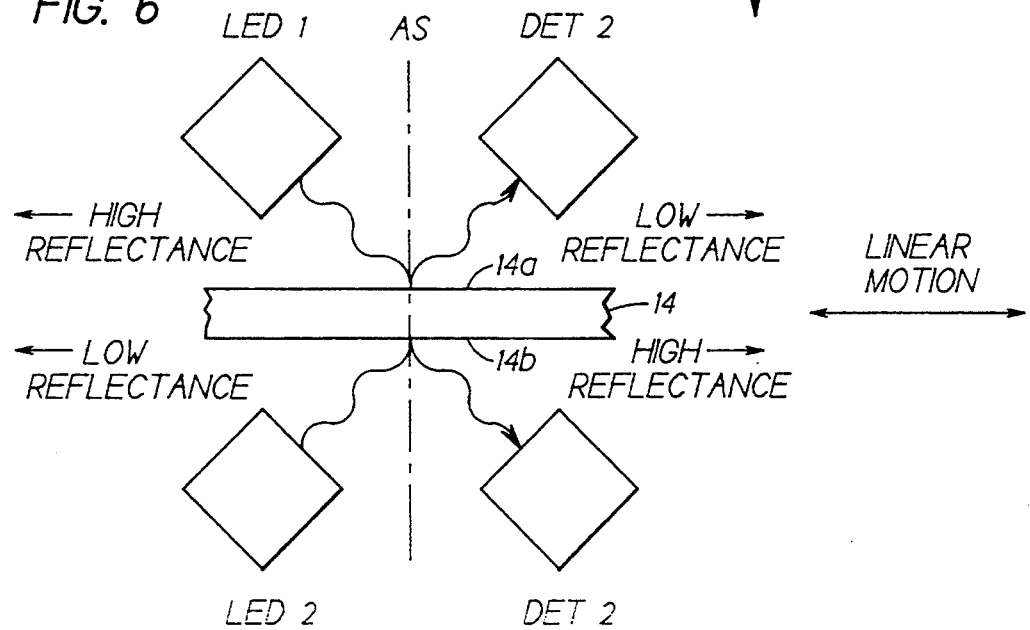
FIG. 6 is a side view of a further embodiment of the invention that operates with a spatially varying reflectivity and at least two source/receiver pairs.

More particularly, and referring to FIG. 6, the regions 14a and 14b can be disposed on opposite sides of the scale 14. Region 14a has a reflectivity that varies from a high value to a low value from one end of the scale to the other, while region 14b has a reflectivity that varies in an opposite manner. Each source/receiver pair is disposed on the same side of the scale 14, and is mounted so that light generated by the LED is reflected or partially reflected from the underlying surface of the scale and is received by the associated DET. It may be desirable to position the LEDs and DETs about an axis of symmetry (AS) such that the point of incidence of each of the transmitted optical beams strikes the surface of the scale at the same point on opposite sides of the scale. In this embodiment the reflectivities of both sides of the scale are made equal at a predetermined point, thereby providing the reference point 14c.

It is also within the scope of the invention to provide the regions 14a and 14b of spatially varying reflectivity upon the same surface of the scale 14, as depicted in FIGS. 1, 3, 4 and 5, and to arrange the source/receiver pairs accordingly.

Thus, while this invention has been particularly shown and described with respect to several embodiments thereof, it will be understood by those skilled in the art that changes in form and details may be made therein without departing from the scope and spirit of the invention.

What is claimed is:

1. A closed loop optical component positioning system for controllably positioning at least one optical component along a translation axis of linear motion, said apparatus comprising:

drive means coupled to said at least one optical component for controllably positioning said at least one optical component along the translation axis of linear motion;

control means having a control output coupled to said drive means, said drive means operating in accordance with said control output; and position sensor means for sensing a position of said at least one optical component along the translation axis of linear motion, said position sensor means comprising, a linear scale that is coupled to said at least one optical component for being translated therewith along the translation axis of linear motion, the scale having an optical characteristic that spatially varies within a first region from a low value to a high value going from a first end of the scale to a second end, and that spatially varies within a second region from a high value to a low value going from the first end to the second end, said linear scale having a long axis that passes through said first and second ends and that is generally parallel to the translation axis of linear motion;

a plurality of optical sources individual ones of which are disposed relative to a said scale for illuminating a portion of one of the regions; and a plurality of optical detectors individual ones of which are disposed relative to said scale for detecting an amount of illumination that results from an interaction of the illumination, from an associated one of said plurality of optical sources, with the optical characteristic within the region illuminated by the associated optical source, each of said plurality of optical detector means having an output coupled to said control means for expressing thereto the detected amount of illumination; wherein said control means is responsive to said outputs of said plurality of detector means for generating said control output in accordance therewith to controllably position said at least one optical component at a desired point along the translation axis.

2. A closed loop optical component positioning system as set forth in claim 1 wherein said drive means includes at least one motor having a rotary encoder output that is coupled to an input of said control means, and wherein said control means is also responsive to said rotary encoder output for generating said control output to controllably position said at least one optical component at the desired point along the translation axis.

3. A closed loop optical component positioning system as set forth in claim 1 wherein the optical characteristic is transmissivity.

4. A closed loop optical component positioning system as set forth in claim 1 wherein the optical characteristic is reflectivity.

5. A closed loop optical component positioning system as set forth in claim 1, wherein said system includes at least one optical axis that is disposed in a generally parallel relationship with said translation axis of linear motion.

6. A closed loop optical component positioning system as set forth in claim 5, wherein said at least one optical component includes a lens, and wherein said at least one optical axis passes through said lens.

* * * * *